(No Model.) O. R. CHASE. 2 Sheets—Sheet 1.

PROCESS OF AND MACHINE FOR MANUFACTURING CONFECTIONERY LOZENGES.

No. 305,048. Patented Sept. 16, 1884.

Witnesses:

Inventor:
Oliver R. Chase,
by N. C. Lombard
Attorney.

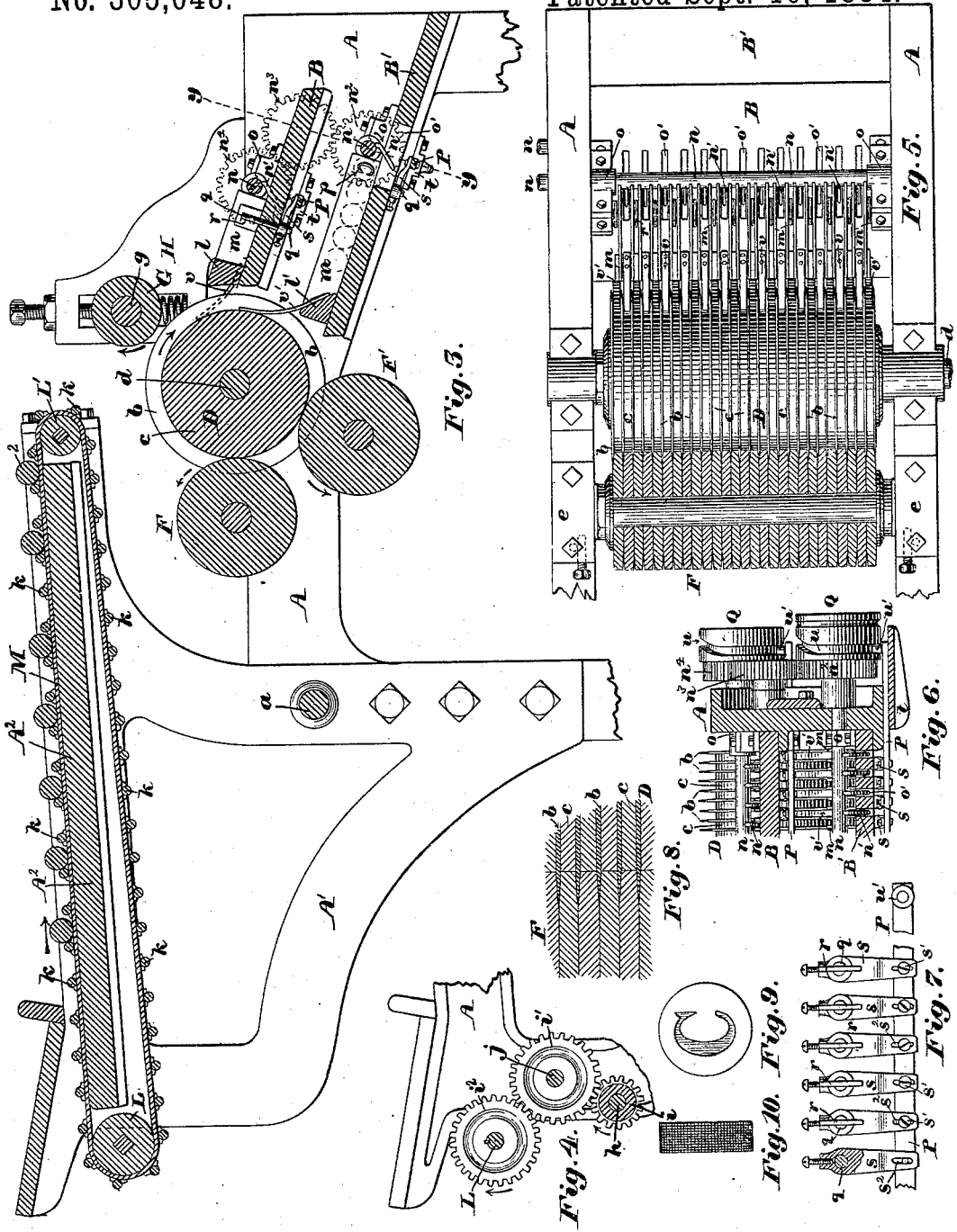

UNITED STATES PATENT OFFICE.

OLIVER R. CHASE, OF BOSTON, MASSACHUSETTS.

PROCESS OF AND MACHINE FOR MANUFACTURING CONFECTIONERY LOZENGES.

SPECIFICATION forming part of Letters Patent No. 305,048, dated September 16, 1884.

Application filed March 19, 1884. (No model.)

*To all whom it may concern:*

Be it known that I, OLIVER R. CHASE, of Boston, in the county of Suffolk and State of Massachusetts, have invented a new and useful Process of and Machine for Manufacturing Confectionery Lozenges, of which the following, taken in connection with the accompanying drawings, is a specification.

My invention relates to an improved process of manufacturing confectionery lozenges and machinery therefor; and it consists in the process of producing confectionery lozenges by first forming the plastic sugar-paste into sticks or bars of the desired cross-section, and then cutting said sticks or bars transversely into thin disks.

It further consists in certain combinations and arrangements of mechanism for carrying out said process, which will be readily understood by reference to the description of the drawings, and to the claims to be hereinafter given.

Figures 1, 11:
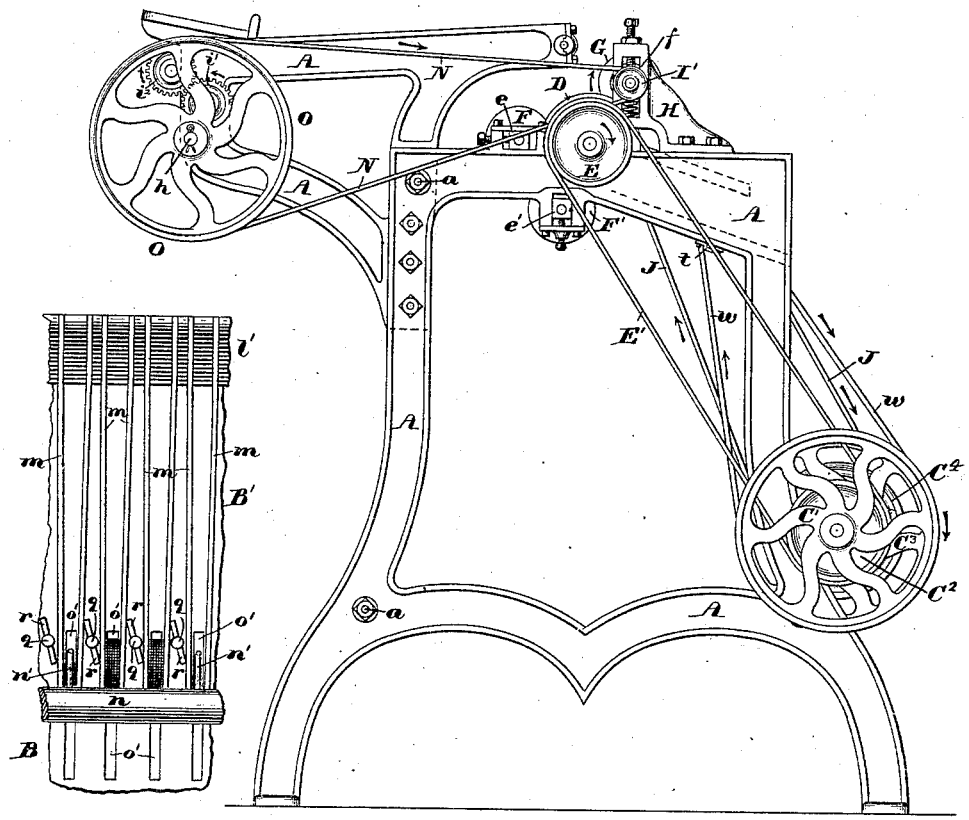
Figure 2:
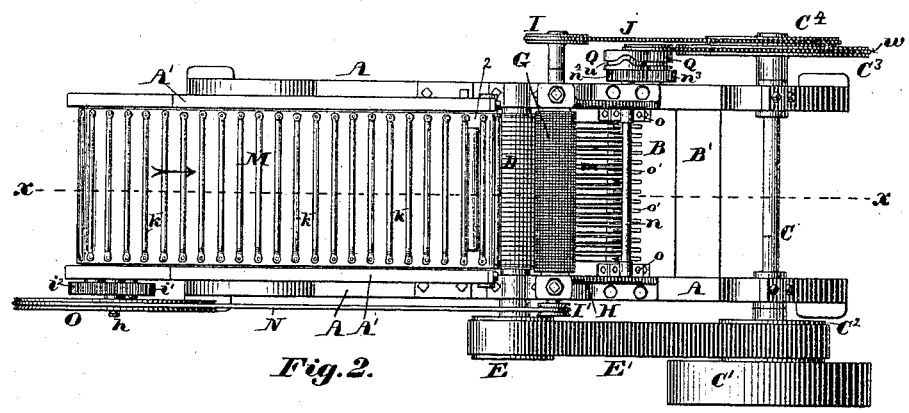

Figure 1 of the drawings is a side elevation of a machine illustrating my invention. Fig. 2 is a plan of the same. Fig. 3 is a partial longitudinal section on line $x\ x$ on Fig. 2. Fig. 4 is an elevation of the gearing for operating the feeding-apron. Fig. 5 is a partial plan, with the cleaning-roll in section. Fig. 6 is a partial vertical section on line $y\ y$ on Fig. 3, and showing the cylinder-cams for operating the embossing mechanism in elevation. Fig. 7 is a plan of a portion of the embossing mechanism detached from the machine. Fig. 8 is a partial section of the cutting-cylinder and one of the cleaning-cylinders. Figs. 9 and 10 are respectively an elevation and an edge view of a lozenge produced by the machine, and Fig. 11 is a partial plan of the side-embossing apparatus with the cams turned into the position for giving the impression.

A A are the main side frames of the machine, connected together by the tie-rods $a\ a$ and the inclined tables or plates B and B'.

C is the driving-shaft, mounted in suitable bearings on the frames A A, and having mounted thereon the pulleys C', $C^2$, $C^3$, and $C^4$, as shown in Fig. 2. Rotary motion is imparted to the shaft C by means of a suitable belt leading from the pulley C' to a main or counter shaft. (Not shown.)

D is a knife-cylinder composed of a series of circular knives, $b\ b$, and a series of disks, $c\ c$, alternating with said knives, and all firmly clamped together upon the shaft $d$, said disks $c\ c$ being of a thickness corresponding to the desired thickness of the lozenge to be produced. The shaft $d$ has mounted upon one end thereof, outside of the frame A, the pulley E, by means of which and the belt E', leading from the pulley $C^2$, rotary motion is imparted to the knife-cylinder D.

F and F' are two cylinders, the bodies of which are composed of a series of felt disks, said cylinders being mounted in adjustable boxes $e\ e$ in such positions relative to the knife-cylinder D that the knives $b\ b$ enter and revolve between the felt disks, as shown in Figs. 3, 5, and 8. The object of the felt cylinders F and F' is to keep the knives $b\ b$ clean by wiping off all particles of the sugar-paste which may adhere to said knives in their passage through the stick or bar of plastic material. Motion is imparted to the cylinders F and F' by frictional contact of the knives $b\ b$ therewith.

G is an embossing-roll mounted in adjustable boxes $f\ f$ in the stands H, bolted to the upper ends of the frames A A, and having firmly secured upon its shaft $g$ the pulleys I and I', as shown. The periphery of the roll G has cut or formed thereon an ornamental surface of any design which it may be desired to transfer to the edges of the lozenges, and said roll is so adjusted relative to the knife-cylinder that its surface shall be in close proximity to, without touching, the edges of the knives $b\ b$, rotary motion in opposition to the motion of the knife-cylinder being imparted thereto by belt J, leading from the pulley I to and around the pulley $C^4$.

A' A' are two supplementary frames bolted to the frames A A, and connected together at their upper edges by the bed or table $A^2$, and having mounted in suitable bearings formed thereon the rolls L and L', around which is stretched the endless apron M, to which motion is imparted by means of the belt N, leading from the pulley I' to and around the pulley O, mounted upon a stud, $h$, set in the side of the frame A', the pinion $i$, secured to the hub of the pulley O, the intermediate gear-wheel, $i'$, also mounted upon a stud, $j$, and the gear-wheel $i^2$, secured upon the shaft of the roll L, all as shown in Figs. 1, 2, 3, and 4. The apron M has secured upon its outer surface a series of rods or bars, $k\ k$, extending transversely across the same, and arranged equidistant from and parallel with each other, as shown in Figs. 2 and 3, said rods or bars being designed to serve as guides in placing the bars or sticks of sugar-paste upon the apron and insure the delivery thereof to the cutting-cylinder in a position parallel to said cylinder and to the embossing-roll G.

Upon the upper portions of the inclined tables or plates B and B' are respectively secured the ribs $l$ and $l'$, to each of which are secured one end of each of a series of thin plates, $m\ m$, set edgewise upon said inclined tables B and B' in positions parallel, or nearly so, to each other and the side frames, A A, of the machine, said plates $m\ m$ being arranged in pairs, one pair upon each inclined table to each alternate space between the knives of the knife-cylinder D, and the plates of each pair being at such a distance apart as to permit the lozenge discharged from the knife-cylinder to roll freely down the incline between said plates till it reaches their lower ends, where it is arrested by the shaft $n$, which extends across the machine just below the lower ends of the plates $m\ m$, and mounted in bearings $o\ o$, secured upon said inclined tables B and B', as shown in Figs. 2, 3, 5, and 6. The plates $m\ m'$ are only secured to the inclined tables indirectly at their upper ends through the ribs $l$ or $l'$, so that their lower ends are free to be moved transversely for the purpose of embossing the sides of the lozenges, as will be described. One or both of the plates $m$ of each pair has formed upon its inner face at its lower end a design or character, which may be in relief or intaglio, as shown at $p$ in Fig. 3, so that when said plates are pressed toward each other, with a lozenge between their lower ends, said design will be impressed upon the side or sides of the lozenge.

In each of the inclined tables B and B' are set a series of short shafts, $q\ q$, at right angles to the upper surfaces of said tables, which project upward from said tables between or alongside of the plates $m\ m$, and have formed thereon or secured thereto two wings or blades, $r\ r$, which serve as cams to move said plates $m\ m$ to emboss the lozenge. These shafts and cam-wings are arranged one in each of the narrower spaces between the plates $m\ m$ and one at each end or outside of said series of plates, as shown in Fig. 5.

To the lower end of each of the shafts $q\ q$ is firmly secured an arm or lever, $s$, the movable end of which is connected to the bar P by means of the screw $s'$, the shank of which passes through a slot, $s^2$, in the lever $s$, and is screwed into said bar P, as shown in Fig. 7. The bar P is mounted in bearings $t\ t$ in such a manner that it may be moved endwise therein by the action of the path $u$ of the cylinder-cam Q upon the truck $u'$, mounted upon a stud set in the end of said bar, as shown in Figs. 6 and 7. The reciprocating movement of the bar P causes an oscillating motion to be imparted to the shafts $q\ q$, by which movement the wings or blades $r\ r$ are made to act upon the plates $m$ upon each side thereof, to force them apart and hard against the lozenge that rests in the space between said plates, where there is no shaft $q$ and cam-wings $r$, as shown in Fig. 11.

To each of the ribs $l$ and $l'$ are secured a series of curved fingers, $v$ and $v'$, respectively, which project upward and backward between the knife-disks, their points or upper ends bearing upon the surfaces of the metal disks $c\ c$ in such a manner that the lozenge or disk of sugar-paste, after being severed by the knives from its fellows and carried beneath the embossing-roll G, will be forced from between the knives $b\ b$ thereby, and made to fall into and roll down the inclined channel between the plates $m\ m$, the fingers $v$ of the upper series entering every alternate space between the cutters $b\ b$, and the fingers $v'$ entering those spaces between the knives $b\ b$ not entered by the fingers $v$, so that the fingers $v$ will remove every alternate lozenge from between the knives, and the fingers $v'$ will remove the remainder.

The shafts $n\ n$ are each provided with a series of fingers, $n'$, which project laterally therefrom, and are arranged and adapted to lift the lozenges from between the plates $m$ after they have been embossed, and carry them over the shaft $n$, and deposit them upon the inclined table B or B', down which they roll or slide and fall into any suitable receptacle arranged to receive them, (not shown in the drawings;) or they may be deposited upon an apron arranged to carry them to any desired place of deposit. Rotary motion is imparted to the shafts $n\ n$ by means of the belt $w$, leading from the pulley $C^3$ to and around a pulley formed upon one end of one of the cylinder-cams Q, mounted upon the ends of the shafts $n\ n$, the motion thus imparted to one of said shafts being transmitted to the other shaft $n$ and its cam Q by means of the spur-gear wheels $n^2$, $n^3$, and $n^4$. The fingers $n'$, when the shafts $n$ are revolved, play through slots $o'\ o'$, cut through the inclined tables B and B', as shown in Figs. 2, 3, 5, and 6.

The operation of my invention is as follows: The sugar-paste of the proper consistency is formed into sticks or bars of any desired cross-section corresponding to the outline of the lozenge to be produced, which may be done by means of either of the machines described in Letters Patent Nos. 279,131, 279,132, or 279,133, granted to me June 12, 1883. The sticks or bars so formed are then taken by the operator, before they become dried and brittle, and placed upon the apron M of the machine herein described, said sticks or bars being placed one at a time thereon, so as to rest between two of the rods or bars $k\ k$, and extend transversely across said apron, as indicated at 2 in Figs. 2 and 3. The machine being set in motion, the apron M carries along with it the stick or bar of sugar-paste in the direction indicated by the arrow until the stick falls from the apron as it passes around the roll L', when said stick is deposited upon the knives $b$ $b$ of the knife-cylinder D in such a position as to be carried forward thereby into contact with the embossing-roll G, which, rotating in a direction opposed to the revolution of said knife-cylinder, as indicated by the arrows on Fig. 3, causes the stick of plastic material to be revolved, so as to bring every part of its periphery into contact with the periphery of said roll G, and receive an impression therefrom at the same time that said stick is forced inward upon the knives $b$ $b$ until it is cut into disks of the desired thickness. The disks so formed are carried around with the cylinder D until the upper end of the fingers $v$ are reached thereby, when said fingers, acting thereon as the knife-cylinder continues to revolve, will gradually remove every alternate lozenge or disk of sugar-paste from between said knives, which disks then fall into and roll down the spaces between the plates $m$ $m$ upon the inclined table B until arrested by the shaft $n$, while the other half of the disks, still remaining between the knives, are carried around therewith till the ends of the fingers $v'$ are reached thereby, when they are gradually forced by said fingers from between the knives $b$ $b$, and fall into and roll down the spaces between the plates $m$ $m$ on the inclined table B' until they are arrested by the shaft $n$. At the proper time the cams O act upon the bars P to move them endwise, and thereby cause the cam-wings $r$ $r$ to assume a position oblique to the plates $m$, and in contact therewith, and cause said plates to be pressed hard against the sides of the lozenges resting between their lower ends, and emboss thereon the desired design, when the motion of the bar P is reversed, and the cam-wings $r$ assume the positions shown in Figs. 5 and 7, and the pressure is removed from the lozenges, at which time the fingers $n'$, carried by the shafts $n$, come in contact with the under edges of the lozenges and lift them over the shafts $n$, and deposit them upon the inclined tables B and B', down which they roll or slide, as before described.

If it is desired to omit the embossing of the sides of the lozenges, the bars P may be disconnected from their operating-cams, so that the cam-wings $r$ $r$ will not be operated; or said bars, cam-wings, and the plates $m$ $m$ may be removed from the machine, and the lozenges will then be deposited upon the tables B and B', down which they would roll without guides into the receptacle provided to receive them.

The stick or bar of plastic material may have a cross-section of almost any desired shape, as round, square, octagonal, hexagonal, heart-shaped, or fluted.

One great advantage of this method of making lozenges is that the material can all be used up, instead of leaving a large quantity of waste material or material that has to be worked over again, as is the case when lozenges are cut from sheets, as heretofore practiced.

What I claim as new, and desire to secure by Letters Patent of the United States, is—

1. The process of manufacturing confectionery lozenges which consists in first forming the sugar-paste into sticks or bars of any desired cross-section, and then cutting each of said bars or sticks transversely into a series of thin disks, as set forth.

2. That improvement in the manufacture of confectionery lozenges which consists in first forming the plastic or semi-plastic sugar-paste into sticks or bars of any desired cross-section, cutting each of said sticks or bars transversely into a series of thin disks, and then embossing one or both sides of each of said disks by impressing thereon or therein any desired design or figure, as set forth.

3. In a machine for making confectionery lozenges, the endless apron M, provided with the series of rods or bars $k$ $k$, arranged and adapted to operate substantially as and for the purposes specified.

4. The combination of the endless apron M, the knife-cylinder D, and the roll G, all arranged and adapted to operate substantially as described.

5. The combination of the knife D, the embossing-roll G, and one or more series of discharging-fingers arranged and adapted to remove the lozenges from between the knives, substantially as described.

6. In combination with the knife-cylinder D and the roll G, one or more knife wiping or cleaning cylinders, F or F', arranged and adapted to operate substantially as described, for the purposes specified.

7. The combination of the knife-cylinder D, the embossing-roll G, the discharging-fingers $v$ or $v'$, and the endless feeding-apron M, all arranged and adapted to operate substantially as and for the purposes described.

8. In a machine for making confectionery lozenges, the combination of revolving cutters for cutting a stick or bar of sugar-paste into a series of disks, and dies for embossing one or both sides of each of said disks, substantially as described.

9. In a lozenge-making machine, a series of inclined channels formed of a series of movable plates having formed thereon designs or characters to be impressed into one or both sides of the lozenges, and a series of cams for moving said plates to impress said designs upon the lozenges, substantially as described.

10. The combination of the knife-cylinder D, the roll G, the two series of fingers $v$ and $v'$, the two inclined tables B and B', the two series of movable plates $m$ $m$, having formed thereon suitable designs or characters, the two series of cams $r$ $r$ and cam-shafts $q$ $q$, the two series of levers $s$ $s$, the two bars P P, and the two cams Q Q, all arranged and adapted to operate substantially as described.

11. The combination of a series of movable plates, m m, provided with suitable designs or characters formed thereon, a series of cams, r, for operating said plates to emboss the lozenges, and the revolving shaft n, provided with a series of fingers, n', all arranged and adapted to operate substantially as and for the purposes described.

In testimony whereof I have signed my name to this specification, in the presence of two subscribing witnesses, on this 6th day of March, A. D. 1884.

OLIVER R. CHASE.

Witnesses:
N. C. LOMBARD,
WALTER E. LOMBARD.